United States Patent
Cronie et al.

(10) Patent No.: US 11,163,611 B2
(45) Date of Patent: Nov. 2, 2021

(54) APPARATUS AND METHOD FOR PROVIDING A VIRTUAL DEVICE

(71) Applicants: SONY CORPORATION, Tokyo (JP); SONY EUROPE B.V., Weybridge (GB)

(72) Inventors: Harm Cronie, Lausanne (CH); Julian Nolan, Lausanne (CH); Makoto Koike, Tokyo (JP)

(73) Assignee: SONY EUROPE B.V., Surrey (GB)

( * ) Notice: Subject to any disclaimer, the term of this patent is extended or adjusted under 35 U.S.C. 154(b) by 181 days.

(21) Appl. No.: 16/480,109

(22) PCT Filed: Jan. 31, 2018

(86) PCT No.: PCT/EP2018/052397
§ 371 (c)(1),
(2) Date: Jul. 23, 2019

(87) PCT Pub. No.: WO2018/141792
PCT Pub. Date: Aug. 9, 2018

(65) Prior Publication Data
US 2019/0391829 A1    Dec. 26, 2019

(30) Foreign Application Priority Data
Jan. 31, 2017  (EP) ..................................... 17154089

(51) Int. Cl.
| | |
|---|---|
| *G06F 9/50* | (2006.01) |
| *G06F 9/455* | (2018.01) |
| *H04L 9/32* | (2006.01) |
| *H04L 9/06* | (2006.01) |
| *H04L 12/911* | (2013.01) |
| *H04L 29/06* | (2006.01) |

(52) U.S. Cl.
CPC ............ *G06F 9/5077* (2013.01); *G06F 9/455* (2013.01); *G06F 9/50* (2013.01); *G06F 9/5027* (2013.01); *H04L 9/0637* (2013.01); *H04L 9/0643* (2013.01); *H04L 9/32* (2013.01); *H04L 47/78* (2013.01); *H04L 47/783* (2013.01); *H04L 63/10* (2013.01)

(58) Field of Classification Search
None
See application file for complete search history.

(56) References Cited

U.S. PATENT DOCUMENTS

| | | | |
|---|---|---|---|
| 2017/0272342 A1* | 9/2017 | Zessin | H04L 41/145 |
| 2019/0266006 A1* | 8/2019 | Cao | G06F 9/45558 |

OTHER PUBLICATIONS

Yoichi Hirai,"Defining the Ethereum Virtual Machine for Interactive Theorem Provers", Financial Cryptography and Data Security. FC 2017. Lecture Notes in Computer Science, vol. 10323, Nov. 19, 2017, 15 pages.

(Continued)

*Primary Examiner* — Qing Yuan Wu
(74) *Attorney, Agent, or Firm* — Chip Law Group (57) ABSTRACT

An apparatus for providing a virtual device has a circuitry. The circuitry searches for resource devices providing characteristics of a set of characteristics of the virtual device in a distributed ledger. The distributed ledger includes information about multiple resource devices. The circuitry provides the virtual device by selecting resource devices providing characteristics of the set of characteristics of the virtual device.

18 Claims, 4 Drawing Sheets

(56) References Cited

OTHER PUBLICATIONS

Samaniego, et al., "Using Blockchain to Push Software-Defined IoT Components onto Edge Hosts", BDAW '16 Proceedings of the International Conference on Big Data and Advanced Wireless Technologies, Nov. 10-11, 2016, 09 pages.

Czepluch, et al., "The Use of Block Chain Technology in Different Application Domains", May 20, 2015, pp. 1-109.

Christidis, et al., "Blockchains and Smart Contracts for the Internet of Things", Special Section on the Plethora of Research in Internet of Things, vol. 4, May 10, 2016, pp. 2292-2303.

"Empowering the Edge Practical Insights on a Decentralized Internet of Things", IBM Institute for Business Value, pp. 1-24.

Patel, et al., "Blockchain Exhumed", 2017 ISEA Asia Security and Privacy (ISEASP), Jan. 29-Feb. 1, 2017, 12 pages.

International Search Report and Written Opinion of PCT Application No. PCT/EP2018/052397, dated Apr. 16, 2018, 13 pages of ISRWO.

Yoichi Hirai, "Defining the Ethereum Virtual Machine for Interactive Theorem Provers", Financial Cryptography Workshops 2017, Apr. 2017, 15 pages.

Czepluch, et al., "The Use of Block Chain Technology in Different Application Domains", The IT University of Copenhagen, May 20, 2015, pp. 1-109.

Samaniego, et al., "Using Blockchain to push Software-Defined IOT Components onto Edge Hosts", Proceedings of the International Conference on Big Data and Advanced Wireless Technologies, Blagoevgrad, Bulgaria, Nov. 10-11, 2016, 09 pages.

Czepluch, et al., "The Use of Block Chain Technology in Different Application Domains", Bachelor Project in Software Development, May 20, 2015, 102 pages.

Christidis, et al., "Blockchains and Smart Contracts for the Internet of Things", IEEE Access, vol. 04, May 10, 2016, pp. 2292-2303.

Veena Pureswaran, "Empowering the edge", Practical insights on a decentralized Internet of Things, IBM Institute tor Business Value, 2NZLY7XJ, 24 pages.

Patel, et al., "Blockchain Exhumed", IEEE, ISEA Asia Security and Privacy (ISEASP), Jul. 13, 2017, 12 pages.

* cited by examiner

APPARATUS AND METHOD FOR PROVIDING A VIRTUAL DEVICE

CROSS REFERENCE TO RELATED APPLICATIONS

This application is a U.S. National Phase of International Patent Application No. PCT/EP2018/052397 filed on Jan. 31, 2018, which claims priority benefit of European Patent Application No. EP 17154089.1 filed in the Europe Patent Office on Jan. 31, 2017. Each of the above-referenced applications is hereby incorporated herein by reference in its entirety.

TECHNICAL FIELD

The present disclosure generally pertains to an apparatus and a method for providing a virtual device.

TECHNICAL BACKGROUND

Generally, it is known to distribute a ledger over multiple entities, e.g. electronic devices, servers or the like, which records digital transactions. Distributed ledgers can be based on the known blockchain technology, on which, for example, the known cryptocurrency bitcoin is based. There is no unified definition about the terms of blockchain and distributed ledger yet. Here, in the broadest definition, the terms are used as a type of database shared digitally recorded data with multiple nodes of a network. It may be comprised of peer to peer network. The digitally recorded data may include a kind of information to prove its consistency from the previously recorded data on the same database.

Distributed ledgers can be public and can be accessible by anyone, but, in principle, they can also be non-public and only users having a permission may have access to them. It is also possible to differentiate the access permission to data on a ledger from each layered users.

Distributed ledgers can use mechanisms, which are known, for example, from the blockchain technology as used for bitcoin. Such mechanisms include a discovery method, a consensus mechanism, a mechanism to keep data consistency and so on. The consensus mechanism ensures that all nodes or more than a certain number of nodes, generally electronic devices, having a copy of the distributed ledger reach consensus on the content of the distributed ledger. There are many consensus mechanisms including the so-called proof-of-work mechanism, which is some kind of crypto-puzzle and which ensures that, for example, older blocks of a blockchain cannot be changed (easily). For instance, proof-of-work is used for the mining process of the bitcoin blockchain.

Another example for a distributed ledger which is based on the blockchain technology is the so-called Ethereum project. Ethereum uses accounts and the state of every account is tracked by the Ethereum blockchain. There are two types of accounts, namely externally owned accounts, which are controlled by private keys and contract accounts, which are controlled by their contract code and which can only be activated by an externally owned account. A contract account can include programmable code or smart contracts. Users of Ethereum also have to pay a fee, which is called ether. Ether is rewarded for mining a block.

Although there exist techniques for using distributed ledgers for transactions and smart contracts, it is generally desirable to apply the distributed ledger technology for organizing electronic devices.

The solutions disclosed here may be replaced with using distributed database technologies like Hadoop.

SUMMARY

According to a first aspect, the disclosure provides an apparatus for providing a virtual device, comprising circuitry configured to searching for resource devices providing characteristics of a set of characteristics of the virtual device in a distributed ledger, wherein the distributed ledger includes information about multiple resource devices; and providing the virtual device by selecting resource devices providing characteristics of the set of characteristics of the virtual device.

According to a second aspect, the disclosure provides a method of providing a virtual device, comprising searching for resource devices providing characteristics of a set of characteristics of the virtual device in a distributed ledger, wherein the distributed ledger includes information about multiple resource devices; and providing the virtual device by selecting resource devices providing characteristics of the set of characteristics of the virtual device.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 1:
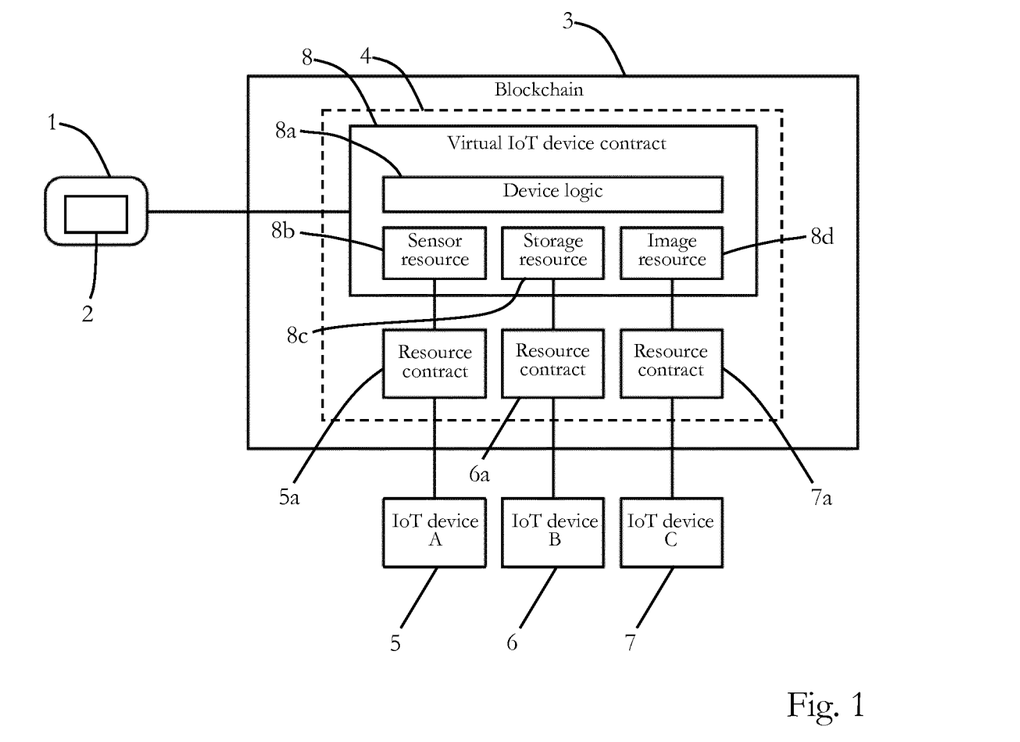
FIG. 1 illustrates an embodiment of the present disclosure, where an apparatus provides a virtual device.

Before presenting a detailed description of the embodiments under reference of FIG. 1, general explanations are made.

As also indicated in the outset, future distributed ledger technology and, in particular, blockchain technology will include feature-rich capabilities to define smart contracts. Smart contracts may be written in a Turing complete programming language such that, for example, complicated business logic, intelligent agents, and the like may be implemented as a smart contract. Smart contracts, such as intelligent agents may be executed on the blockchain architecture.

It was recognized that electronic devices, which are connected over a network, e.g. Internet-of-Things (IoT) devices, can use the distributed ledger technology in several ways. According to a first example, the distributed ledger or blockchain may be used to share data between such devices. According to a second example, resources of the devices may be traded on the blockchain. According to a third example, the blockchain may establish a trust relation between subsets of devices.

As discussed in the outset, it is known to distribute a ledger over multiple entities, e.g. electronic devices, servers or the like, which records digital transactions. Distributed ledgers can be based on the known blockchain technology, on which, for example, the known cryptocurrency bitcoin is based. There is no unified definition about the terms of blockchain and distributed ledger yet. Here, in the broadest definition, the terms are used as a type of database shared digitally recorded data with multiple nodes of a network. It may be comprised of peer to peer network. The digitally recorded data may include a kind of information to prove its consistency from the previously recorded data on the same database.

Distributed ledgers may be public and can be accessible by anyone, but, in principle, they can also be non-public and only users having a permission may have access to them. It is also possible to differentiate the access permission to data on a ledger from each layered users.

Distributed ledgers may use mechanisms, which are known, for example, from the blockchain as used for bitcoin. Such mechanisms include a discovery method, a consensus mechanism, a mechanism to keep data consistency and so on. The consensus mechanism ensures that all nodes or more than a certain number of nodes, generally electronic devices, having a copy of the distributed ledger reach consensus on the content of the distributed ledger. There are many consensus mechanisms including so-called proof-of-work mechanism, which is some kind of crypto-puzzle and which ensures that, for example, older blocks of a blockchain cannot be changed (easily). For instance, proof-of-work is used for the mining process of the bitcoin blockchain.

Another example for a distributed ledger which is based on the blockchain technology is the so-called Ethereum project. Ethereum uses accounts and the state of every account is tracked by the Ethereum blockchain. There are two types of accounts, namely externally owned accounts, which are controlled by private keys and contract accounts, which are controlled by their contract code and which can only be activated by an externally owned account. A contract account can include programmable code or smart contracts. Users of Ethereum also have to pay a fee, which is called ether. Ether is rewarded for mining a block.

Accordingly, some embodiments pertain to an apparatus for providing a virtual device, comprising circuitry configured to searching for resource devices providing characteristics of a set of characteristics of the virtual device in a distributed ledger, wherein the distributed ledger includes information about multiple resource devices; and providing the virtual device by selecting (which may include combining) resource devices providing characteristics of the set of characteristics of the virtual device.

The apparatus can be any type of electronic apparatus, e.g. a general purpose computer, a system of computers, a mobile device (smartphone or the like), a server, a network node, a node of a distributed ledger network, etc.

The circuitry may include one or more processors, but it may also include more electronic components of the apparatus, in particular, such electronic components which are necessary to perform the methods and processes described herein.

A virtual device may be a virtual electronic device which has a set of predefined characteristics. These characteristics can be pre-defined, for example, by a user. Such characteristics may include software, business, hardware characteristics, such as geographical characteristics, sensor characteristics, computational characteristics, fee characteristics, time characteristics, etc.

The distributed ledger may be distributed over multiple entities, such as electronic devices, servers, or the like which may be interconnected with each other, for example, over a network, which may include the internet, and which may be nodes of a network of the distributed ledger network.

The apparatus may be configured to be connected to a network (local area network, wireless network and the like) and it may even have access to the internet over the network. The apparatus (the circuitry) may include a network interface or the like and the circuitry may be configured to communicate over the network. The apparatus may also be a node of the distributed ledger network.

The resource devices may be any kind of electronic device or even a part of an electronic device. The resource devices may be interconnected with each other and/or with the apparatus over a network, which may include the internet.

The resource devices may have several characteristics, and the distributed ledger includes information about multiple resource devices.

The apparatus may include a copy of the distributed ledger and/or the apparatus may have access to a copy of the distributed ledger such that the apparatus can search through the distributed ledger and can find resource devices which provide one or more characteristics of the set of characteristics of the virtual device.

The apparatus provides the virtual device by selecting resource devices providing characteristics of the set of characteristics of the virtual device. These resource devices are found and obtained by searching through the distributed ledger.

Electronic devices, such as IoT devices are expected to have a long lifetime. However, with technological advances potential capabilities of IoT may increase fast. Hence, customers may not wish to buy a new device on a regular basis but have different means to upgrade their device. A possibility is an over-the-air software upgrade, but additional functionality may require additional hardware support, which may not be easy to achieve or may even be impossible to achieve with known devices. It may also happen that a user may wish to use an electronic device for a limited amount of time, but, current solutions typically do not offer a flexible solution when a user requires a device on a temporary basis. For example, a medical monitoring device may only be needed by a user during an illness. Moreover, electronic devices typically have a rather fixed functionality. Thus, if additional functionality is required, the user may have to buy a new device. Finally, with current solutions it is difficult to reuse components of an electronic device for other purposes.

By providing a virtual device as discussed herein, these issues may be addressed, since the virtual device may be defined on a demand basis such that for any demand a respective virtual device may be defined, and if respective resource devices are found, the virtual device can be provided.

Hence, since a device, such as a network or IoT device can be defined in a virtual manner as a virtual device, flexibility in terms of the configuration of the virtual device is provided. Furthermore, the capabilities of a virtual device may be easy to be upgraded. Users or the apparatus described herein may operate and own a virtual device only for the time they require its services. Additionally, virtual devices may reuse resources of resource devices that are not used. This also provides the possibility for revenue for owners of resource devices.

By using a distributed ledger, such as a blockchain, for defining a virtual device a (completely) distributed approach may be achieved. In some embodiments, virtual devices will need to run program code and logic to implement their functionality. Such program code may be defined in the language of a smart contract and may be run on the blockchain. This may provide a fully automated way to interact with other elements of the blockchain (e.g. other virtual IoT devices, smart contracts, etc.).

In some embodiments, the circuitry is further configured to generating a virtual device smart contract, based on the set of characteristics of the virtual device. Hence, the virtual device smart contract may be used to define the virtual device and, for example, its characteristics, such as the resources it has. The resources may be, for example, sensors, storage, computational capabilities and the like. Generally, as mentioned, the characteristics may include at least one of hardware (sensor, storage, computational resources, etc.), software (programming language (e.g. Turing language) and other types of characteristics, such as business characteristics (fee to be paid, usage time, number of users, etc.).

The circuitry may be further configured to storing the virtual device smart contract in the distributed ledger.

Thereby, the smart contract may even be executed by the distributed ledger, e.g. by nodes (servers, electronic devices, etc.) maintaining the distributed ledger.

The circuitry may be further configured to activating the virtual device. This can be implemented, for example, by activating the smart contract on the distributed ledger.

As indicated, the distributed ledger may be a blockchain, which may be based, for example, on the principles used for the bitcoin or for the Ethereum project. The blockchain may implement typical mechanisms, such as consensus mechanism which ensures that every node maintaining the blockchain (distributed ledger) reach a consensus on the content of the blockchain. It may use mining and proof-of-work mechanisms and it even may use some kind of reward (currency), such as ether or bitcoin as currency and/or as reward for performing mining.

The blockchain may include multiple blocks which are formed, for example, on the basis of the information about the multiple resource devices and/or on the basis of the information about the virtual device provided, e.g. the virtual device smart contract. In some embodiments, the information about the multiple resource devices includes smart contract information (e.g. smart contract), which includes, for example, information about the resources (capabilities) of the resource devices, a fee to be paid, the (time of) availability, etc. The information may be provided to the blockchain in the form of transactions.

The smart contract information may also include program code or device logic (code) which may be executed for controlling the respective resource device.

Generally, smart contracts and smart contract information mentioned herein may be based on a Turing (complete) language, such that it is universally applicable.

As in some embodiments, the resource devices may be nodes of the network maintaining the distributed ledger (or blockchain), the distributed ledger may be maintained (at least partially) by resource devices.

The resource devices, which may be real-world or physical devices, may be configured to expose their resources and capabilities on the distributed ledger or blockchain, such as sensor capability, storage capability, computational capabilities and the like (see also description above.

Some embodiments pertain to a method of providing a virtual device, wherein the discussion of the features which are performed by the circuitry of the apparatus fully apply to the method. The method comprises searching for resource devices providing characteristics of a set of characteristics of the virtual device in a distributed ledger, wherein the distributed ledger includes information about multiple resource devices; and providing the virtual device by selecting resource devices providing characteristics of the set of characteristics of the virtual device, as discussed above. The method may comprise generating a virtual device smart contract, based on the set of characteristics of the virtual device, as discussed above. It may comprise storing the virtual device smart contract in the distributed ledger and it may comprise activating the virtual device, as discussed above. The resource devices may be connected to a network, such as the internet (Internet of Things), as discussed above. The distributed ledger may be a blockchain, as discussed above. The information about the multiple resource devices may include smart contract information, which may include program code and may be based on a Turing language, as discussed above.

Returning back to FIG. 1, there is illustrated a general overview of an embodiment of the present disclosure.

An apparatus 1, e.g. an electronic device, computer, or the like, which has a circuitry 2 is provided. The apparatus 1 communicates with a blockchain 3, which has multiple blocks, wherein exemplary a block 4 is illustrated. The blockchain 3 is an example of a distributed ledger, which is maintained by multiple computers, servers or the like (not shown).

Moreover, real world or physical devices 5, 6 and 7, are provided, which communicate over a network, in the present case over the internet, and which are also referred to as IoT ("Internet of Things") device A, B and C, and which are considered as resource devices as discussed above.

The IoT devices A, B, and C may be, in principle any kind of device, which is able to communicate over the internet, such as a camera, sensor, a storage or similar. Of course, the disclosure is not limited to a specific number of devices and the number of three devices 5, 6 and 7 is arbitrarily chosen for illustration purposes.

The IoT devices 5, 6, and 7 have access to the blockchain 3. Such access may be permissioned or non-permissioned.

These IoT devices 5, 6, and 7 have different capabilities in terms of available sensors, storage capacity, computational capabilities, actuators, etc. in the present embodiment. Furthermore, these IoT devices 5, 6 and 7 are owned by different users and are located at different locations in this embodiment without limiting the present disclosure in that regard.

It is possible that not all resources of the IoT devices 5, 6, and 7 are used or they are not used on a continuous basis. With the present embodiment resources of resource devices, such as IoT devices 5, 6 and 7 may be reused. For this purpose, each one of the IoT device 5, 6 and 7 creates and/or provides a respective resource contract on the blockchain 3 and in the block 4, respectively, in the present embodiment. Here, the resource contract is a smart contract that defines the resources that are exported by the IoT device 5, 6 or 7 and the availability of the resources. Furthermore, the IoT device 5, 6 or 7 may require that any party using the resource will remunerate the IoT device 5, 6 or 7 or its owner. Hence the cost of the resource is also defined in the resource contract. Examples of resources that may be exported by the IoT devices 5, 6 and 7 are storage capacity for data, data communication capabilities for data, measurements taken by sensors, images and videos taken by a camera, the ability to actuate in the physical world, etc.

The apparatus 1 with its circuitry 2 creates a virtual IoT device that uses several different resources that are exported by IoT devices on the blockchain, such as IoT devices 5, 6 and 7, e.g. as transactions.

A virtual IoT device contract 8 may define the virtual IoT device and the resources it uses, e.g. sensor resource 8b, storage resource 8c and compute resource 8d in the present embodiment. The virtual IoT device contract 8 is a smart contract that also contains device logic 8a, in this embodiment. The device logic 8a is program code that defines the operation of the virtual IoT device. Such program code is implemented in the Turing complete language supported by smart contracts of the present blockchain 3.

A user may create the virtual IoT device contract 8 with the apparatus 1 for a limited amount of time. During configuration of the virtual IoT device resources or resource devices, e.g. IoT devices 5, 6 or 7 may be selected based on several criteria. Examples of such criteria are the availability of the resource device, the performance characteristics of the resource device, and the cost of the resource device, and the like. For some types of resource devices the location of the resource may also be important. An example of such a resource device is a sensor that measures a physical quantity related to the user of the virtual IoT device, a camera which images a specific area, etc. For other resource devices the physical location might not be important, for example, a storage space for data, which may reside at a different location than the apparatus 1.

Generally, after the virtual IoT device contract 8 is defined and after the resource contracts 5a, 6a and 7a of the selected IoT devices 5, 6 and 7 are added (e.g. as a transaction), a block 4 may be formed by the blockchain 3. As mentioned above, this may involve a proof-of-work mechanism, as it is generally known. In some embodiments, there may be a reward for finding a block, e.g. a bitcoin, ether or other virtual/digital currency or the like.

In some embodiments, the state of a virtual IoT device may be archived for later use. This may be done, for example, by storing the setup of the virtual IoT device and/or the virtual IoT device contract 8 in a storage, for example, of apparatus 1. When the virtual IoT device is started again, each of its resources has to be fulfilled by physical resource devices, e.g. IoT devices 5, 6 and 7. Resource contracts can be selected on the blockchain that fulfill the resources. Once all resources are fulfilled, the virtual IoT device can be started again.

In other embodiments, the resources of the virtual IoT devices are implemented in a redundant manner by physical resource devices, e.g. IoT devices 5, 6 and 7.

After having described a more general implementation of the present disclosure, in the following some more concrete examples of embodiments are given.

For example, the virtual IoT device can be a virtual plant and crop monitor. Such a virtual IoT device monitors plants and crops of a consumer or farmer in an indoor and/or outdoor situation. The virtual IoT device may use the following sensor resources: A satellite imaging system may be used, which provides e.g. low-resolution footage of the area where the crops grow. From this footage water content in the growing area may be detected. A weather station may be used, which provides the latest weather forecasts. The sensor data are stored, for example, in a resource provided by a storage device with spare storage capability.

The virtual IoT device can be reconfigured to use, for example, additional sensors, sensors having better capabilities, etc. For example, a drone might be available, which provides a high-resolution hyper-spectral image of the growing area from which detailed crop information may be derived. For instance, the current state of fruits on trees may be assessed automatically including their ripeness. A farmer may order this functionality with the apparatus 1 provided by such a drone when fruits start to appear on the trees.

In another embodiment, a virtual IoT device is configured to monitor medication usage of a patient. Such a virtual IoT device may be created for the duration that the patient is ill. The resources of the virtual device may include cameras owned by the patient or cameras that can image the patient. These cameras can also be integrated and located in other electronic devices, e.g. a mobile phone, laptop or the like and can record footage of the patient in his home and work environment. The virtual IoT device may also use functionality provided by smart medication boxes to detect when pills are taken out of the box. The virtual IoT device program may use footage of the patient together with information from the smart medication box to detect when a patient takes his medication. To store the information a storage resource is required also which can be provided by any IoT device with storage capability. The virtual IoT device may use resources provided by a mobile phone to inform the patient that medication has not been taken yet.

Figure 4:
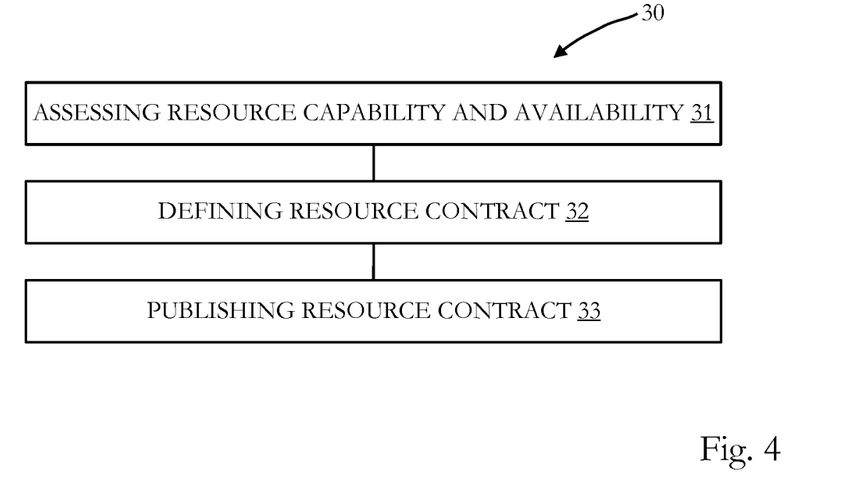
FIG. 4 shows a flowchart of a method for providing a resource contract on a blockchain.
Figure 5:
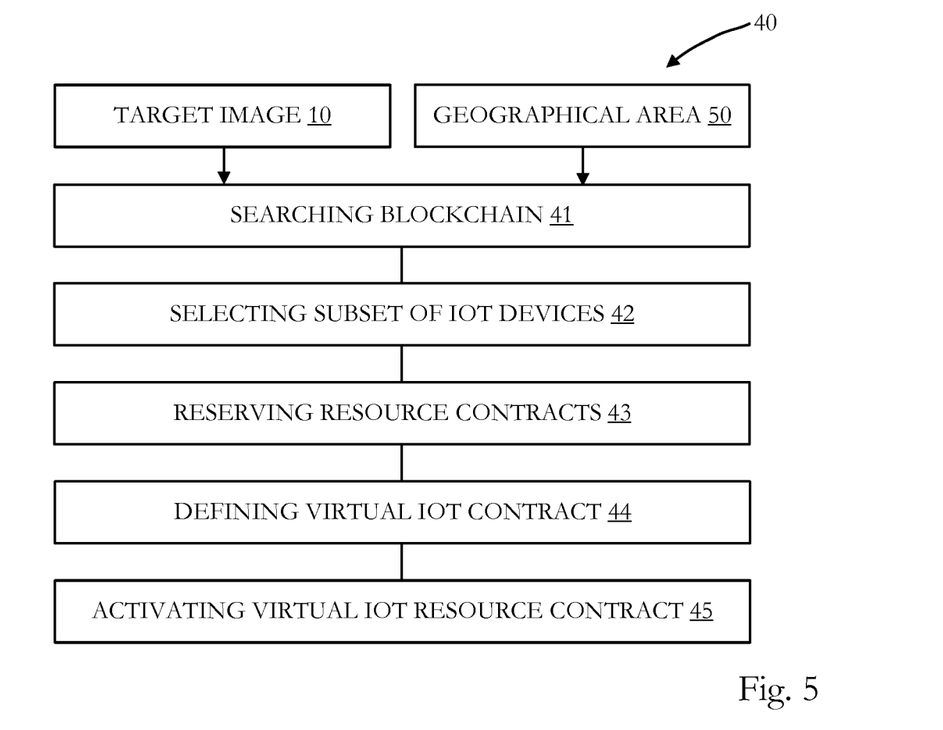
FIG. 5 shows a flowchart of a method for providing a virtual IoT device smart contract.

In the following a further embodiment is described under reference of FIGS. 3 to 5. In this embodiment, the virtual IoT device is a surveillance system and it is based on the general architecture as described in association with FIG. 1.

Figure 2:
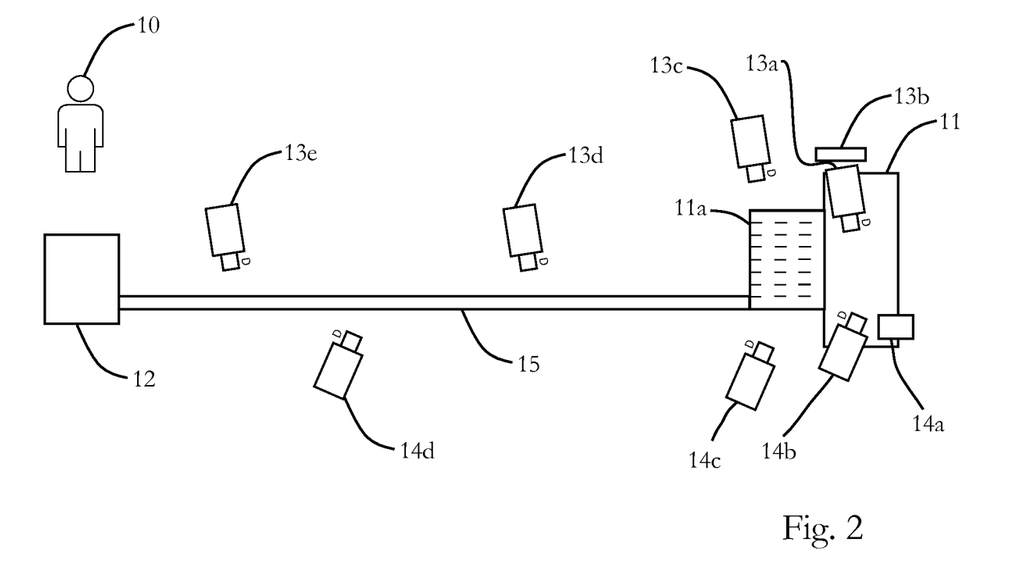
FIG. 2 illustrates an overview of resource devices which can be used in an embodiment of the present disclosure.

FIG. 2 illustrates a real world setup with different resource devices.

For example, a first company has resource devices 13a to 13e and a second company has resource devices 14a to 14d.

The first company has cameras 13a, 13c, 13d and 13e, wherein camera 13a is located in a building 11, camera 13c is located at a parking space 11a, and cameras 13d and 13e are located along a street 15. Moreover, the first company has a storage 13b.

The second company has a camera 14b in the building 11, a second camera 14c at the parking space 11a and a third camera 14d at the street 15. Moreover, the second company has an ID sensor 14a in the building 11. In the following, it is assumed that a customer wants to surveil a person (target), e.g. on the basis of a target image 10 of the person. The person works in the building 11 and goes back to his home 12 along the street 15, where the person should be surveilled.

An overview of the system is now further described with reference to FIG. 3.

Figure 3:
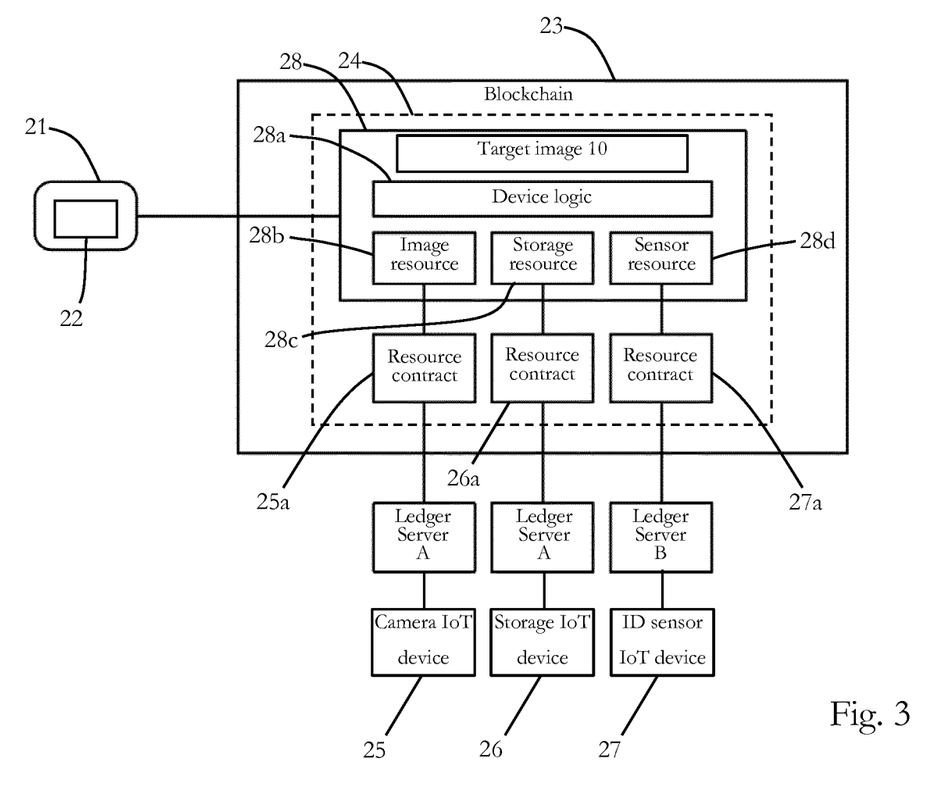
FIG. 3 illustrates a further embodiment of the present disclosure, where an apparatus provides a virtual IoT surveillance monitor using the resource devices illustrated in FIG. 2.

FIG. 3 shows an exemplary set of IoT devices, more generally, as categories, namely exemplary a camera IoT device 25, which symbolizes cameras 13a and 13c-e of FIG. 2 and which is owned by the first company. The IoT device 25 is connected to a company server of the first company, referred to as "ledger server A". Furthermore, a storage IoT device 26 is connected to the ledge server A of the first company, which symbolizes storage 13b of the first company. Additionally, an ID sensor IoT device 27 is connected to a ledger server B of the second company, which symbolizes the ID sensor 14a of the second company. Of course, also the cameras 14b to 14d may be connected to the ledger server B, the illustration of which is omitted for clarity reasons in FIG. 3. Furthermore, additional ledger servers of additional companies may be provided.

The set of ledger servers of all companies, including ledger servers A and B, maintains a distributed ledger or blockchain 23. Access to the blockchain 23 may be permissioned such that only authorized ledger servers have access to it. In other embodiments, access to the blockchain 23 is open.

In principle and as also discussed above, each of the ledger servers A, B, etc. has a local copy of the blockchain 23.

Each of the IoT devices 25, 26 and 27 (or the ledger server it is connected to) creates a resource contract 25a, 26a and 27a implemented as smart contract that describes the capabilities and availability of the respective IoT device 25, 26 and 27, as discussed above. The resource contract is incorporated into a block 24 of the blockchain 23, e.g. in the form of a transaction.

A user may define and use a virtual IoT device with an apparatus 21 including a circuitry 22. In the present embodiment, the virtual IoT device is a surveillance monitor. The virtual IoT device uses the resources owned by different companies, such as 13a to 13e and 14a to 14d of FIG. 2 and symbolized by IoT devices 25, 26 and 27, and apparatus 21 can use the blockchain 23 to find the resources.

In the following, a method 30 for providing a resource contract on the blockchain 23 is described under reference of FIG. 4.

As mentioned, for the virtual IoT device being a surveillance monitoring service, the IoT devices may be e.g. cameras (13a, 13c-e, 14b-d) that image a certain geographical area, storages (13b) which may include images of a certain geographical area, ID sensors (14a) which recognize the personal ID of a specific person, etc. These IoT devices, summarized as 25, 26 and 27 in FIG. 3, or the respective ledger servers A and B to which they are connected, may define a resource contract for the blockchain 23 according to the method 30 of FIG. 4.

At 31 the IoT devices 25, 26 and 27 may asses their current capabilities. These capabilities include for instance the type of camera (color, black and white, infrared), the resolution and frame rate of camera records, the geographical area of the camera records, etc.

Furthermore, the availability, for example, of the camera IoT device 25 is also assessed. For instance, the camera IoT device 25 may only be online during night time. For the storage IoT device 26, the time of availability might not be so important, since image data stored in the storage IoT device 26 may be investigated at any time.

The capabilities of the IoT device may be stored in IoT device itself. For instance, the capabilities of the camera IoT device 25 may be stored in a storage of the IoT device 25 and can be read from it if needed. The assessment of capabilities of the IoT devices 25, 26 and 27 may also be performed by the respective ledger server that owns the IoT device 25, 26 and 27 or which has control over it.

At 32, a resource contract 25a, 26a and 27a is defined for each of the IoT devices 25, 26 and 27, wherein the resource contract is a smart contract.

The resource contract 25a, 26a, 27a is in a format as defined by the blockchain 23 that is used. In the present embodiment, the resource contract 25a, 26a, 27a comprises a look-up table that links the different capabilities and availability with e.g. a numerical value. The look-up table may be implemented by standard data structures available in the smart contract language of the blockchain 23, which may be a Turing complete language. For instance, the look-up table may be implemented as a list, dictionary, hash table or the like.

At 33, the IoT devices 25, 26, 27 or the respective ledge servers publish the resource contracts 25a, 26a, 27a for inclusion into the block 24 of the blockchain 23. The resource contracts 25a, 26a and 27a may be, for example, announced in a special type of transaction.

Once mining is performed, e.g. by the ledger servers A and B, the resource contracts 25a, 26a and 27a are included as block 24 into the blockchain 23.

As discussed, the virtual IoT device that serves as a surveillance monitor interacts with several resource devices, which are defined by resource contracts, depending on its configuration. In the present embodiment, the virtual IoT device may use resource devices 13a-e and 14a-d (symbolized by 25-26) in order to surveil a specific person which is identified by the target image 10. As discussed, the resource devices 25, 26 and 27 published their respective resource contract 25a, 26a and 27a on the blockchain 23.

The virtual IoT device serving as a surveillance monitor is implemented as a smart contract 28 (see FIG. 3).

The virtual IoT device comprises a target image 10, a device logic 28a and a set of resources, namely exemplary an image resource 28b, storage resource 28c and a sensor resource 28d.

The image resources 28b are provided by the camera IoT device 25, which symbolizes that set of cameras 13a and 13c-e. As discussed, the camera devices 14b-d may also be provided for the image resource 28b.

Similarly, the storage resource 28c is provided by the storage IoT device 26 including the storage 13b and the sensor resource 28d is provided by the sensor IoT device 27 including the ID sensor 14a.

During configuration of the virtual IoT device, the smart contract 28 has been created with the appropriate resources 28b-d.

In the following, a method 40 for providing a virtual IoT device serving as a surveillance monitor is described under reference of FIG. 5, which can also be performed by the apparatus 21 and its circuitry 22, respectively.

The target image 10 that defines the target for tracking by the virtual IoT surveillance system, and the geographical area where the target will be tracked are input into the method 40 (and may also be input into the virtual IoT device).

At 41, the blockchain 23 is searched for resource contracts, such as resource contracts 25a, 26a and 27a, which are capable of imaging the geographical area that is input to the method 40 and which are able to provide further tracking information, e.g. on the basis of images stored in a storage and determined ID of the target. Hence, apparatus 21 searches the blockchain 23 for resource contracts which fit to the resources 28b, 28c and 28d.

At 42, a subset of the found devices is selected that fulfil additional requirements, such as a resolution that is high enough (i.e. above a pre-defined threshold), a frame rate that is high enough (i.e. above a pre-defined threshold), additional image processing functionality that can be executed on the imaging IoT device, etc. In the present embodiments, this subset includes devices 25, 26 and 27.

At 43, the selected resources are reserved on the blockchain 23 for the time that the target as defined by the target image 10 needs to be tracked. For implementing a reservation of the resource devices 25, 26 and 27, transactions may be added to the blockchain 23 and the block 24, respectively.

At 44, apparatus 21 defines the virtual IoT smart contract 28 that uses the reserved resources 25, 26 and 27.

The virtual IoT device contract 28 is added to a block 24 of the blockchain 23 with a transaction, thereby it is activated at 45.

In some embodiments, the virtual IoT device contract 28 is only activated after mining for the block (24) in which the virtual IoT device contract 28 is included, has been finished.

The virtual IoT device smart contract may also contain device logic/program code (such as device logic 28a) that will be executed for the lifetime of the virtual IoT device. For instance, the device logic 28a may take care of acquiring the data from the resources, and performing some processing. In the context of the surveillance monitor, the recognition of the target could also be performed by the device logic/program code in the smart contract.

Figure 6:
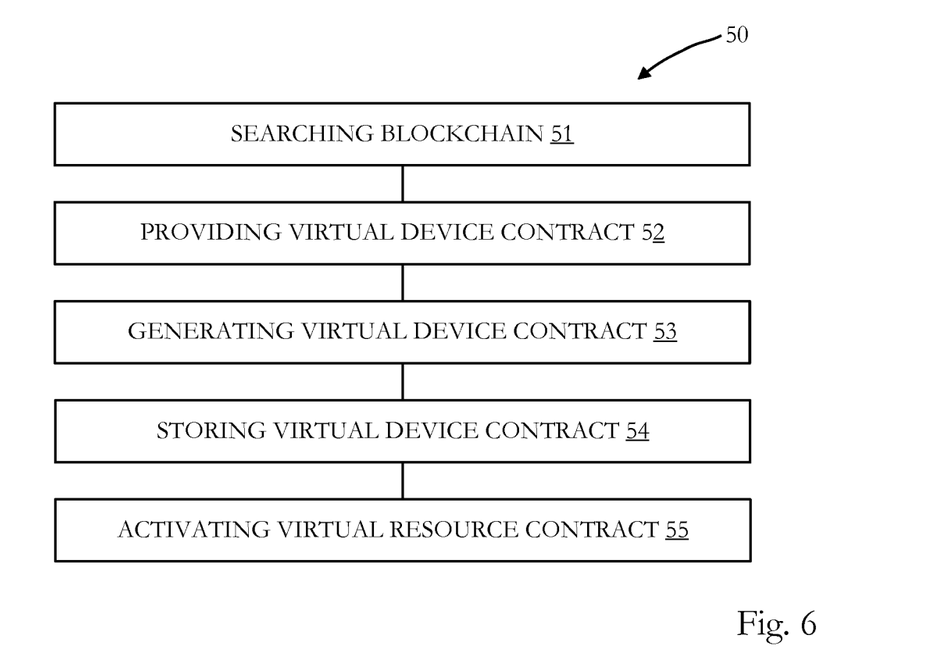
FIG. 6 shows a flowchart of a method for providing a virtual device.

In the following, a general method 50 is discussed under reference of FIG. 6 which may be performed by an apparatus as described herein, such as apparatus 1, 21 or 90, which is discussed further below.

At 51, it is searched for resource devices providing characteristics of a set of characteristics of the virtual device in a distributed ledger (e.g. blockchain 3 or 23 described above), wherein the distributed ledger includes information about multiple resource devices, as discussed above.

At 52, the virtual device is provided by selecting resource devices providing characteristics of the set of characteristics of the virtual device, as discussed above.

At 53, a virtual device smart contract is generated, based on the set of characteristics of the virtual device, as discussed above.

At 54, the virtual device smart contract is stored in the distributed ledger.

At 55, the virtual device is activated, as discussed above.

Figure 7:
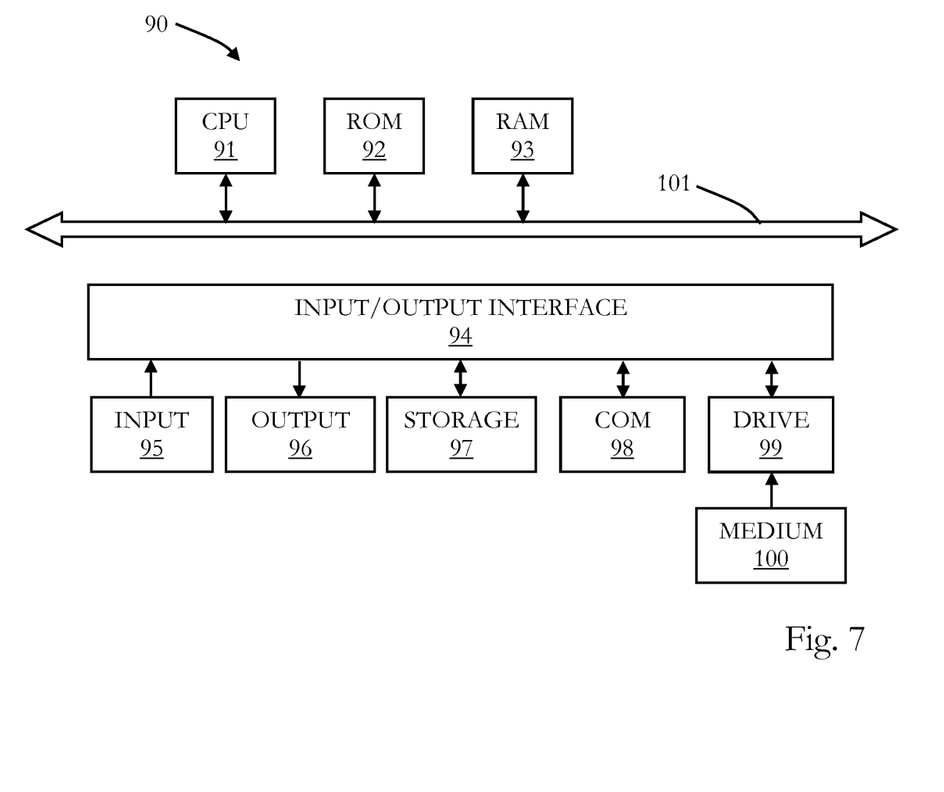
FIG. 7 illustrates an embodiment of an apparatus.

In the following, an embodiment of a general purpose computer 90 is described under reference of FIG. 7.

The computer 90 can be such implemented that it can basically function as an apparatus, e.g. apparatus 1 or 21, as described herein. The computer has components 91 to 100, which can form a circuitry, such as anyone of the circuitries of the apparatus described herein.

Embodiments which use software, firmware, programs or the like for performing the methods as described herein can be installed on computer 90, which is then configured to be suitable for the concrete embodiment.

The computer 90 has a CPU 91 (Central Processing Unit), which can execute various types of procedures and methods as described herein, for example, in accordance with programs stored in a read-only memory (ROM) 92, stored in a storage 97 and loaded into a random access memory (RAM) 93, stored on a medium 100 which can be inserted in a respective drive 99, etc.

The CPU 91, the ROM 92 and the RAM 93 are connected with a bus 101, which in turn is connected to an input/output interface 94. The number of CPUs, memories and storages is only exemplary, and the skilled person will appreciate that the computer 90 can be adapted and configured accordingly for meeting specific requirements which arise, when it functions as an apparatus described herein.

At the input/output interface 94 several components are connected: an input 95, an output 96, the storage 97, a communication interface 98 and the drive 99 into which a medium 100 (compact disc, digital video disc, compact flash memory, or the like) can be inserted.

The input 95 can be a pointer device (mouse, graphic table, or the like), a keyboard, a microphone, a camera, a touchscreen, etc.

The output 96 can have a display (liquid crystal display, cathode ray tube display, light emittance diode display, etc.), loudspeakers, etc.

The storage 97 can have a hard disk, a solid state drive and the like.

The communication interface 98 can be adapted to communicate, for example, via a local area network (LAN), wireless local area network (WLAN), mobile telecommunications system (GSM, UMTS, LTE, etc.), Bluetooth, infrared, etc.

It should be noted that the description above only pertains to an example configuration of computer 90.

Alternative configurations may be implemented with additional or other sensors, storage devices, interfaces or the like.

The methods as described herein are also implemented in some embodiments as a computer program causing a computer and/or a processor to perform the method, when being carried out on the computer and/or processor. In some embodiments, also a non-transitory computer-readable recording medium is provided that stores therein a computer program product, which, when executed by a processor, such as the processor described above, causes the methods described herein to be performed.

It should be recognized that the embodiments describe methods with an exemplary ordering of method steps. The specific ordering of method steps is however given for illustrative purposes only and should not be construed as binding.

In so far as the embodiments of the disclosure described above are implemented, at least in part, using a software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) An apparatus for providing a virtual device, comprising circuitry configured to:
  searching for resource devices providing characteristics of a set of characteristics of the virtual device in a distributed ledger, wherein the distributed ledger includes information about multiple resource devices; and
  providing the virtual device by selecting resource devices providing characteristics of the set of characteristics of the virtual device.

(2) The apparatus of (1), wherein the circuitry is further configured to generating a virtual device smart contract, based on the set of characteristics of the virtual device.

(3) The apparatus of (2), wherein the circuitry is further configured to storing the virtual device smart contract in the distributed ledger.

(4) The apparatus of anyone of (1) to (3), wherein the circuitry is further configured to activating the virtual device.

(5) The apparatus of anyone of (1) to (4), wherein the resource devices are connected to a network.

(6) The apparatus of (5), wherein the network includes the internet.

(7) The apparatus of anyone of (1) to (6), wherein the distributed ledger is a blockchain.

(8) The apparatus of anyone of (1) to (7), wherein the information about the multiple resource devices includes smart contract information.

(9) The apparatus of (8), wherein the smart contract information includes program code.

(10) The apparatus of (8) or (9), wherein the smart contract information is based on a Turing language.

(11) A method of providing a virtual device, comprising:

searching for resource devices providing characteristics of a set of characteristics of the virtual device in a distributed ledger, wherein the distributed ledger includes information about multiple resource devices; and providing the virtual device by selecting resource devices providing characteristics of the set of characteristics of the virtual device.

(12) The method of (11), further comprising generating a virtual device smart contract, based on the set of characteristics of the virtual device.

(13) The method of (12), further comprising storing the virtual device smart contract in the distributed ledger.

(14) The method of anyone of (11) to (13), further comprising activating the virtual device.

(15) The method of anyone of (11) to (14), wherein the resource devices are connected to a network.

(16) The method of (15), wherein the network includes the Internet.

(17) The method of anyone of (11) to (16), wherein the distributed ledger is a blockchain.

(18) The method of anyone of (11) to (17), wherein the information about the multiple resource devices includes smart contract information.

(19) The method of (18), wherein the smart contract information includes program code.

(20) The method of (18) or (19), wherein the smart contract information is based on a Turing language.

(21) A computer program comprising program code causing a computer to perform the method according to anyone of (11) to (20), when being carried out on a computer.

(22) A non-transitory computer-readable recording medium that stores therein a computer program product, which, when executed by a processor, causes the method according to anyone of (11) to (20) to be performed.

The invention claimed is:

1. An apparatus, comprising:
circuitry configured to:
search, in a distributed ledger, for a plurality of resource devices that provides at least one characteristic of a set of characteristics of a virtual device, wherein
the set of characteristics of the virtual device includes at least one of geographical characteristics, sensor characteristics, storage characteristics, computational characteristics, fee characteristics, or time characteristics, and
the distributed ledger includes information about the plurality of resource devices;
select the plurality of resource devices based on the search;
generate a virtual device smart contract in the distributed ledger based on the set of characteristics of the virtual device and the selected plurality of resource devices;
execute a first program code defined in the virtual device smart contract in the distributed ledger; and
provide the virtual device based on the selection of the plurality of resource devices that provides the at least one characteristic of the set of characteristics of the virtual device and the execution of the first program code.

2. The apparatus of claim 1, wherein the circuitry is further configured to store the virtual device smart contract in the distributed ledger.

3. The apparatus of claim 2, wherein the circuitry is further configured to activate the virtual device based on the execution.

4. The apparatus of claim 1, wherein the plurality of resource devices is connected to a network.

5. The apparatus of claim 4, wherein the network includes internet.

6. The apparatus of claim 1, wherein the distributed ledger is a blockchain.

7. The apparatus of claim 1, wherein the information about the plurality of resource devices includes smart contract information.

8. The apparatus of claim 7, wherein the smart contract information includes a second program code.

9. The apparatus of claim 7, wherein the smart contract information is based on a Turing language.

10. A method of providing a virtual device, comprising:
searching, in a distributed ledger, for a plurality of resource devices that provides at least one characteristic of a set of characteristics of the virtual device, wherein
the set of characteristics of the virtual device includes at least one of geographical characteristics, sensor characteristics, storage characteristics, computational characteristics, fee characteristics, or time characteristics, and
the distributed ledger includes information about the plurality of resource devices;
selecting the plurality of resource devices based on the search;
generating a virtual device smart contract in the distributed ledger based on the set of characteristics of the virtual device and the selected plurality of resource devices;
executing a first program code defined in the virtual device smart contract in the distributed ledger; and
providing the virtual device based on the selection of the plurality of resource devices that provides the at least one characteristic of the set of characteristics of the virtual device and the execution of the first program code.

11. The method of claim 10, further comprising storing the virtual device smart contract in the distributed ledger.

12. The method of claim 11, further comprising activating the virtual device based on the execution.

13. The method of claim 10, wherein the plurality of resource devices is connected to a network.

14. The method of claim 13, wherein the network includes internet.

15. The method of claim 10, wherein the distributed ledger is a blockchain.

16. The method of claim 10, wherein the information about the plurality of resource devices includes smart contract information.

17. The method of claim 16, wherein the smart contract information includes a second program code.

18. The method of claim 16, wherein the smart contract information is based on a Turing language.

* * * * *